(12) United States Patent
Kathan (10) Patent No.: US 10,393,875 B2
(45) Date of Patent: Aug. 27, 2019

(54) TIME OF FLIGHT BASED SENSOR

(71) Applicant: Nortek Security & Control LLC, Carlsbad, CA (US)

(72) Inventor: Sivakumar Kathan, Ocenaside, CA (US)

(73) Assignee: Nortek Security & Control LLC, Carlsbad, CA (US)

( * ) Notice: Subject to any disclaimer, the term of this patent is extended or adjusted under 35 U.S.C. 154(b) by 0 days.

(21) Appl. No.: 15/847,767

(22) Filed: Dec. 19, 2017

(65) Prior Publication Data

US 2019/0187283 A1    Jun. 20, 2019

(51) Int. Cl.
| | | |
|---|---|---|
| *G01S 7/486* | (2006.01) | |
| *G01S 17/10* | (2006.01) | |
| *G08B 13/08* | (2006.01) | |

(52) U.S. Cl.
CPC ............ *G01S 17/10* (2013.01); *G01S 7/4865* (2013.01); *G08B 13/08* (2013.01)

(58) Field of Classification Search
CPC .............................. G01S 7/4865; G08B 13/08
See application file for complete search history.

(56) References Cited

U.S. PATENT DOCUMENTS

| | | | |
|---|---|---|---|
| 5,007,199 A * | 4/1991 | Dunagan ............... | G08B 13/08 340/547 |
| 6,945,363 B2 | 9/2005 | Angst et al. | |
| 7,221,288 B2 | 5/2007 | Fitzgibbon et al. | |
| 7,446,862 B2 | 11/2008 | Zambon | |
| 7,916,018 B2 | 3/2011 | Eskildsen et al. | |
| 8,274,037 B2 | 9/2012 | Ritter et al. | |
| 8,868,376 B2 | 10/2014 | De Coi | |
| 8,994,229 B2 | 3/2015 | Blair | |
| 9,189,933 B1 | 11/2015 | Stevens et al. | |

(Continued)

FOREIGN PATENT DOCUMENTS

| | | |
|---|---|---|
| EP | 2250519 A1 | 11/2010 |
| WO | WO-2005088561 A3 | 9/2005 |

OTHER PUBLICATIONS

"Contact Sensors", ismartalarm, (accessed Mar. 23, 2018), 2 pgs, published Feb. 16, 2017.

(Continued)

*Primary Examiner* — Yara B Green
(74) *Attorney, Agent, or Firm* — Schwegman Lundberg & Woessner, P.A.

(57) ABSTRACT

An adjustable security sensor device is described. The device comprises a time of flight sensor, a user input element, and a processor. The time of flight sensor generates a first set of sample distance measurements based on a first position of the time of flight sensor relative to the reflector, in response to receiving the identification of the first position of the device relative to the reflector. The processor associates the identification of the first position with the first set of sample distance measurements. A second set of sample distance measurements is measured based on a second position of the time of flight sensor relative to the reflector. The processor compares a first range of the first set of sample distance measurements with a second range of the second set of sample distance measurements, and identifies a position of the device relative to the reflector based on the comparison.

18 Claims, 8 Drawing Sheets

(56) References Cited

U.S. PATENT DOCUMENTS

| | | | |
|---|---|---|---|
| 9,270,319 | B2 | 2/2016 | Bietz et al. |
| 9,466,164 | B2 | 10/2016 | Kagerer |
| 9,476,979 | B2 | 10/2016 | Drader |
| 9,576,449 | B2 | 2/2017 | Smith |
| 9,637,132 | B2 | 5/2017 | Clarke et al. |
| 10,147,286 | B2 * | 12/2018 | Seelman ............... G08B 13/08 |
| 2013/0201286 | A1 * | 8/2013 | Schockmel ......... G07C 9/00111 348/46 |
| 2016/0358430 | A1 * | 12/2016 | Smith .................. G01S 13/886 |
| 2017/0002593 | A1 | 1/2017 | Lee et al. |
| 2017/0356238 | A1 * | 12/2017 | Gitman .................... E06B 7/28 |
| 2019/0057585 | A1 * | 2/2019 | Shamsian .............. G01B 7/023 |

OTHER PUBLICATIONS

"DW-sensor (DW=DAL1 Wireless combined sensor)", Glamox, (accessed Mar. 23, 2018), 5 pgs, published Apr. 10, 2016.

"Intersil's Breakthrough Time-of-Flight IC Revolutionizes Object Detection and Distance Measurement", Intersil, (accessed Mar. 23, 2018), 4 pgs, published Oct. 13, 2015

"Proximity Sensors", STMicroelectronics, (accessed Mar. 23, 2018), 3 pgs, pulished Nov. 21, 2016.

"VL53L0X World smallest Time-of-Flight (ToF) ranging sensor", STMicroelectronics, (accessed Mar. 23, 2018), 40 pgs, published May 2016.

Ackerman, Evan, "Automatic Sliding Doors Get Star Trek Intelligence", IEEE Spectrum, (Jun. 12, 2014), 2 pgs.

Bilger, Markus, "A World of 3D Sensors", Novus Light, (Jul. 17, 2017), 7 pgs.

Davis, James, et al., "Time-of-Flight Imaging: Algorithms, Sensors and Applications", Dagstuhl Seminar 12431, (Oct. 2012), 26 pgs.

\* cited by examiner

TIME OF FLIGHT BASED SENSOR

BACKGROUND

Current door and window sensors operate in a binary mode: open or closed indicators. In particular, door and window sensors that rely on a magnetic switch can be defeated by securing a magnet in a correct position to falsely hold a reed switch in a closed position. These sensors have limited capability in the adjustment of the magnet placement. The dynamic range between the magnet and the sensor is principally for compensation of the gap between the magnet and the sensor due to the door/window construction and is restricted to fairly narrow separations.

The typical security sensor uses a reed switch that is placed in very close proximity (usually less than 1") to a magnet to indicate only an open or closed state. So, if a homeowner wants to sleep with his or her window cracked ajar, the homeowner would need to either disarm the security system completely or install two magnets (one for the open position, and one for the closed position) and very carefully open the window to a specific position to avoid triggering an open state with an alarm system.

BRIEF DESCRIPTION OF THE DRAWINGS

The present embodiments are illustrated by way of example, and not by way of limitation, in the figures of the accompanying drawings.

DETAILED DESCRIPTION

Although the present disclosure has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense.

The present disclosure describes a door or window sensor that incorporates a user-adjustable feature to allow the sensor to function at various door/window positions. For example, operating the sensor at various positions (instead of the binary open or closed position) would allow a security system to monitor a partially open door or window without triggering an alarm since the window is already open at a defined user-selected position. However, any variation from the user-selected position would trigger an alarm.

The present disclosure describes using a device with a distance measuring sensor (e.g., time of flight sensor) that incorporates a large dynamic range. This increased dynamic range allows for large separations between the sensor and an edge or a frame of the window. A set-point threshold for the window or door is user-adjustable by way of a "set" button or switch on the device. Once the device is installed on a frame of the window, the set point (e.g., distance measurement) is sampled when the "set" button is pressed. If the user-set distance is changed by re-positioning the door or window, then an alarm can be triggered. One advantage of using the presently described device is the ability to have a window or door open and still be alarm-protected.

A typical security sensor most often uses a reed switch placed in very close proximity (usually less than 1") to a magnet to indicate only a binary state: open or closed. With the presently described device, the sensor may be placed much further away, in different directions, and with a user-adjustable distance threshold.

For example, currently, if a homeowner wants to sleep with his or her window cracked ajar, the homeowner needs to install two magnets (one for the open position, and one for the closed position) and very carefully open the window to a specific position. With the presently described sensor, the homeowner will be able to use a single sensor to open the window as much or as little as he or she wants, while still being able to detect an intrusion.

In various embodiments, a device includes a distance sensor, a user input element, and a processor. The distance sensor generates a first set of sample distance measurements based on a first position of the distance sensor relative to a reflector external to the device. The user input element receives an identification of the first position of the device relative to the reflector and associates the first position with the first set of sample distance measurements. The processor uses the distance sensor to generate a second set of sample distance measurements. The processor determines a first range of the first set of sample distance measurements and a second range of the second set of sample distance measurements. The first range is compared with the second range. The processor identifies or determines the position of the device (e.g., open, close, ajar) relative to the reflector based on the comparison.

In one example embodiment, the distance sensor includes a time of flight sensor. The device is mounted to a portion of a window. The reflector is mounted to a portion of a frame of the window. The device is within a line of sight of the time of flight sensor. The identification of the first position includes one of an open position, a closed position, and an ajar position.

In another example embodiment, the user input element receives an identification of a second position of the device relative to the reflector. The processor uses the time of flight sensor to generate a third set of sample distance measurements using the time of flight sensor. The processor determines a third range of the third set of sample distance measurements and associates the second position of the device with the third range of the third set of sample distance measurements.

In another example embodiment, the processor determines that the second range does not overlap with the first range and the third range. The processor generates a trigger notification to a security system in response to determining that the second range does not overlap with the first range and the third range. The security system triggers an alarm in response to trigger notification.

In another example embodiment, the processor calculates sample distance measurements with the distance sensor and determines a movement direction (e.g., window is closing or opening) of the device relative to the reflector based on a change in the sample distance measurements.

In another example embodiment, the processor determines that the first range overlaps with the second range and that the device is at the first position in response to determining that the first range overlaps with the second range.

In another example embodiment, the maximum measurement of the first set of sample distance measurements corresponds to a maximum value of the first range. A minimum measurement of the first set of sample distance measurements corresponds to a minimum value of the first range. A maximum measurement of the second set of sample distance measurements corresponds to a maximum value of the second range. A minimum measurement of first set of sample distance measurements corresponds to a minimum value of the second range. The processor determines that the maximum value of the second range is less than the minimum value of the first range and generates a trigger notification to a security system in response to determining that the maximum value of the second range is less than the minimum value of the first range. The security system triggers an alarm in response to trigger notification.

In another example embodiment, the processor communicates to a security system the position of the device relative to the reflector. The security system triggers an alarm in response to the second range being outside the first range.

In another example embodiment, the user input element includes a multi-position switch operable at a first switch position corresponding to a first position of the device relative to the reflector, and at a second switch position corresponding to a second position of the device relative to the reflector.

In another example embodiment, the user input element includes a single button switch. A first pattern of depressing the single button switch identifies a first position of the device relative to the reflector. A second pattern of depressing the single button switch identifies a second position of the device relative to the reflector.

Figure 1A:
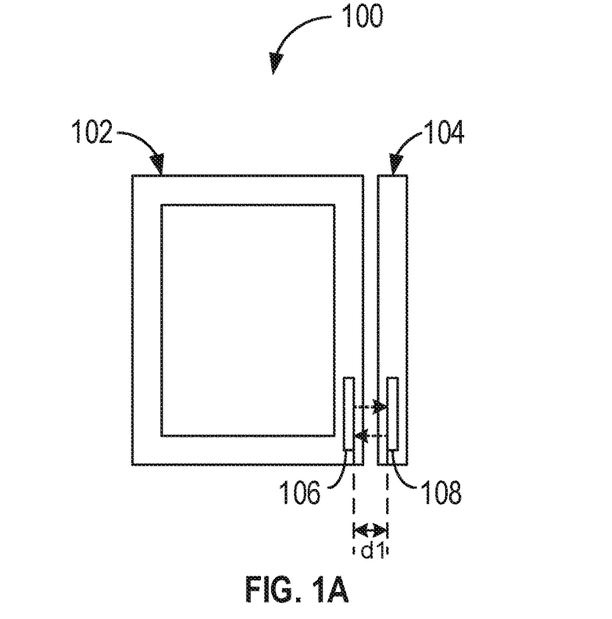
FIG. 1A is a diagram illustrating a user-adjustable window sensor attached to a window in a closed position.

FIG. 1A is a diagram illustrating a user-adjustable window sensor attached to a window in a closed position 100. A window 102 is illustrated in a closed position 100 in FIG. 1A. A device 106 (also referred to as a sensor device, dynamic range sensor device, and a user-adjustable window sensor) is mounted to the window 102. An optional reflector 108 is mounted to a frame 104 and is adjacent to the user-adjustable window sensor when the window 202 is in the closed position 100. The device 106 includes a distance sensor that measures the distance d1 between the device 106 and the reflector 108 or between the device 106 and the frame 104.

Figure 1B:
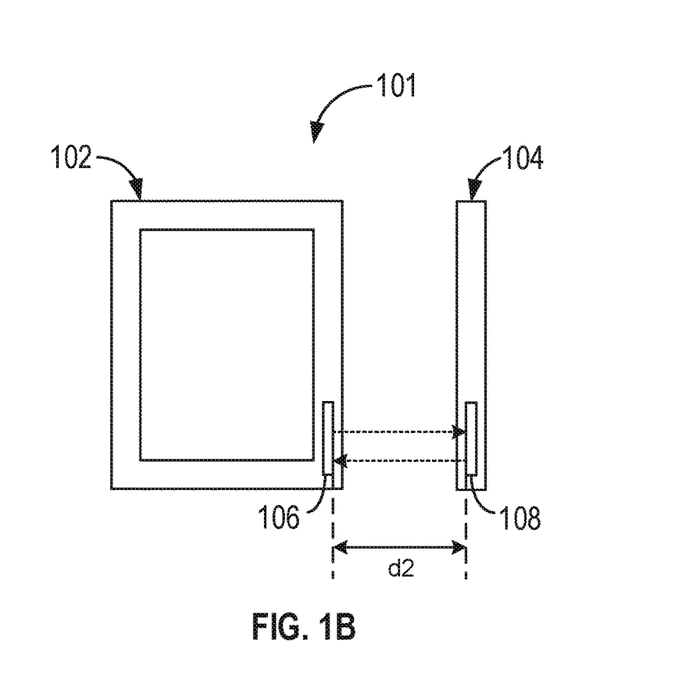
FIG. 1B is a diagram illustrating a user-adjustable window sensor attached to a window in an open position.

FIG. 1B is a diagram illustrating a user-adjustable window sensor attached to a window 102 in an open position 101. When the window 102 is opened to a user-defined location as illustrated in FIG. 1B, the device 106 samples the distance from the device 106 and determines that the sampled magnetic field measurements correspond to a range associated with the user-defined location. The dynamic range sensor device 106 then determines that the window 102 is opened to a distance d2 associated with the user-defined location.

Figure 2:
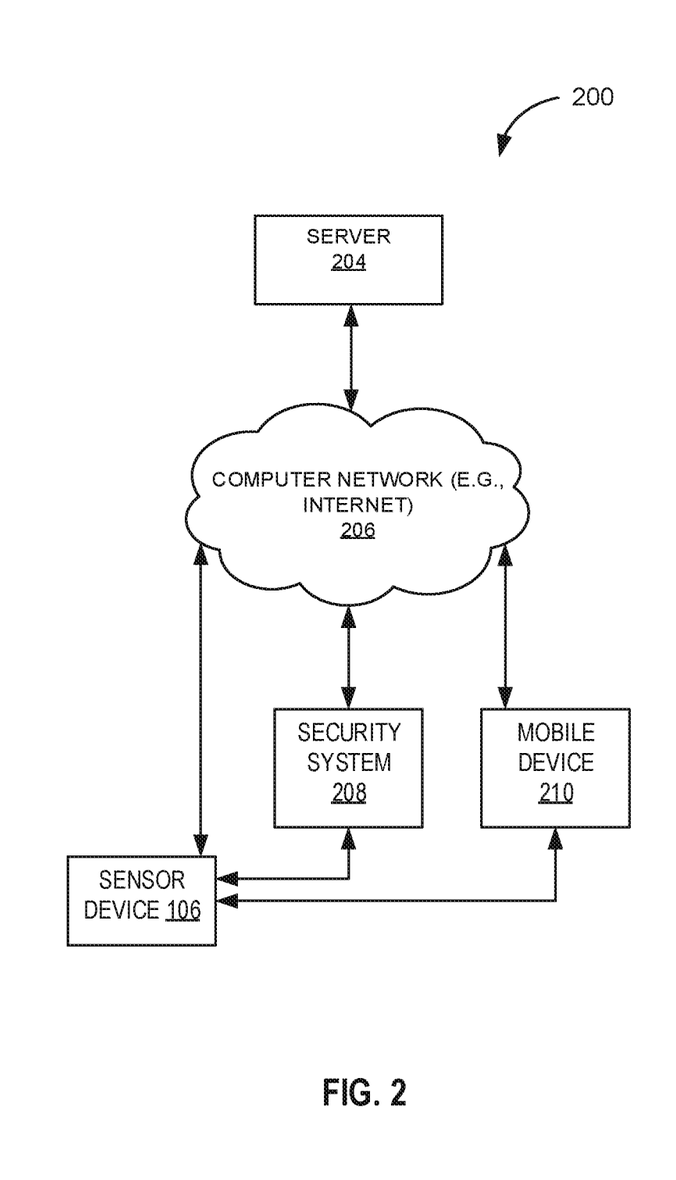
FIG. 2 is a block diagram illustrating an example embodiment of a network system for implementing a dynamic range sensor device.

FIG. 2 is a block diagram illustrating an example embodiment of a network system for implementing a dynamic range sensor device 106. In one example embodiment, the dynamic range sensor device 106 communicates with a security system 208 via wireless means (e.g., radio frequency (RF), Wi-Fi, Bluetooth). The security system 208 communicates with a server 204 via a communication network 206 (e.g., the Internet). In another example embodiment, the dynamic range sensor device 106 communicates with a mobile device 210 via wireless means. The mobile device 210 communicates with the server 204 via the communication network 206. In another example embodiment, the dynamic range sensor device 106 communicates with the server 204 via the communication network 206.

The server 204 receives the position, speed of movement, direction of movement of the window 102 and performs different functions based on the position/speed/direction of the window 102. For example, the server 204 can alert or notify the homeowner that the window 102 has been left open at position A for more than x hours. The security system 208 may still be capable of being armed even when the window 102 is open, for example, when the window 102 is cracked open to position A. The security system 208 monitors for any movement of the window 102 away from position A and triggers an alarm.

Figure 3:
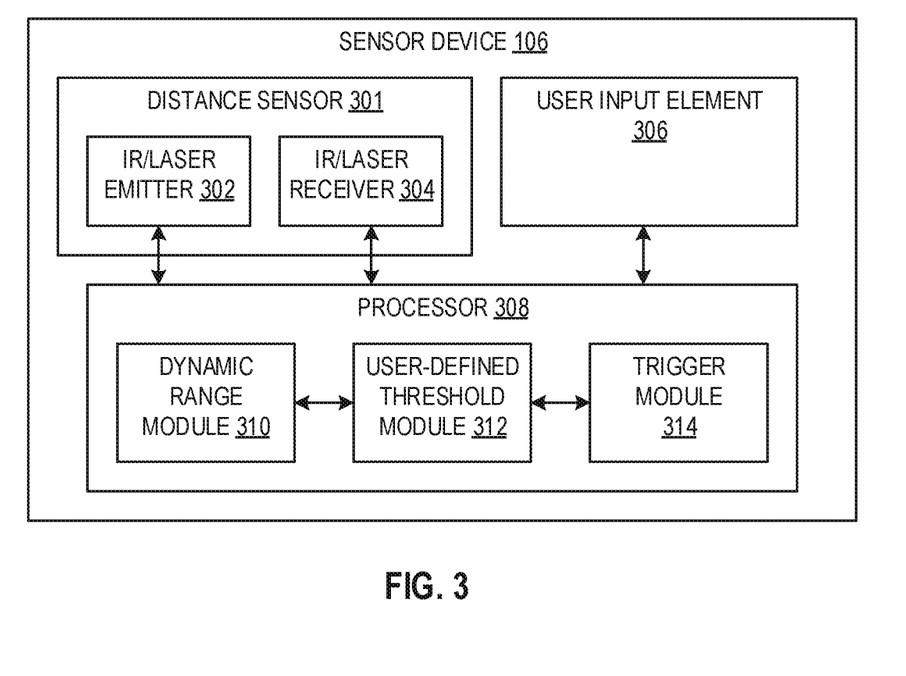
FIG. 3 is a block diagram illustrating an example embodiment of a dynamic range sensor device.

FIG. 3 is a block diagram illustrating an example embodiment of the dynamic range sensor device 106. The dynamic range sensor device 106 includes a distance sensor 301, a user input element 306, and a processor 308. In one example embodiment, the distance sensor 301 includes a time of flight sensor that uses an infrared (IR) emitter 302 and an infrared (IR) receiver 304. The distance sensor 301 computes a distance based on the elapsed time between a signal sent from the IR emitter 302 and the time the signal is received at the IR receiver 304.

In one example embodiment, the distance sensor 301 generates a sample of distance measurements in response to a user input (e.g., a user pushing a button) generated by the user input element 306 (e.g., a button, a switch, or any other user interface). The user input element 306 may be used to identify one or more user-selected positions (e.g., distances) of the dynamic range sensor device 106 relative to the reflector 108.

The processor 308 includes a dynamic range module 310, a user-defined threshold module 312, and a trigger module 314. The dynamic range module 310 receives sensor data (e.g., sample distance measurements) from the distance sensor 301. In one example embodiment, the dynamic range module 310 samples the sensor data to generate a range of distance measurements corresponding to a position of the dynamic range sensor device 106 relative to the reflector 108. For example, the user mounts the dynamic range sensor device 106 on the window 102 so that the dynamic range sensor device 106 is adjacent to the reflector 108. The user identifies the closed position 100 by pressing on the user input element 306 (e.g., a button named "closed"). In response to detecting the user input element 306 corresponding to the closed position 100, the dynamic range module 310 directs the distance sensor 301 to generate a sample of distance measurements. For example, the sample may include a preset number of distance measurements (e.g., five measurements within a second). The dynamic range module 310 then identifies or computes a first range based on the sampled distance measurements. The dynamic range module 310 then associates the first range with the closed position 100. Therefore, the dynamic range module 310 is capable of determining whether the window 102 is closed or open by comparing a measured distance with the first range. If the measured distance is within the first range, the window 102 considered closed. If the measured magnetic field is outside the first range, the window 102 is considered open.

The user-defined threshold module 312 enables a user to set or add additional positions (e.g., half way open, one-third open, a quarter open) besides completely closed and or open (even if the window is partially opened). For example, after teaching or training the dynamic range sensor device 106 about the distance to the reflector 108 in the closed position 100, the user opens the window 102 to a desired location as previously illustrated in FIG. 1B. Once the window 102 is at the desired location, the user triggers the user input element 306 (e.g., the user presses a button named "position A"). In response to detecting the user triggering the user input element 306 (e.g., pressing the button named "position A"), the user-defined threshold module 312 directs the distance sensor 301 to generate a sample of distance measurements. The dynamic range module 310 then identifies or computes a second range based on the sampled distance measurements. The user-defined threshold module 312 then associates the second range with the user-defined position (e.g., position A). Therefore, the user-defined threshold module 312 is capable of determining whether the window 102 is located at the user-defined position by comparing a measured distance with the second range. If the measured distance is within the second range, the window 102 is deemed to be located or positioned at the user-defined position. If the measured distance is outside the first and second ranges, the window 102 is deemed open and not located at the user-defined position. Those of ordinary skill in the art will recognize that additional user-defined positions may be added using a similar process to that previously described.

The trigger module 314 directs the distance sensor 301 to sample distance measurements to detect any variation in the measured distances outside the first or second ranges. For example, if the processor 308 determines that the sensor data from the distance sensor 301 is within the first range and subsequently the measured distance has changed to a measurement outside the first range (but is within the second range as well), the trigger module 314 generates a notification signal to an alarm system to indicate that the window 102 has moved from the closed position 100. Similarly, if the processor 308 determines that the sensor data from the distance sensor 301 is within the second range and subsequently the measured distance has changed to a measurement outside the second range, the trigger module 314 generates a notification signal to the alarm system to indicate that the window 102 has moved away from the user-defined position.

The dynamic range sensor device 106 includes a wired or wireless communication component (not shown) configured to communicate with another device such as a control panel of a home security system or a remote server 204 (e.g., via the Internet). In one example embodiment, the communication component transmits the position or state (e.g., open, closed, position A, position B) to the home security system or the remote server 204.

Figure 4:
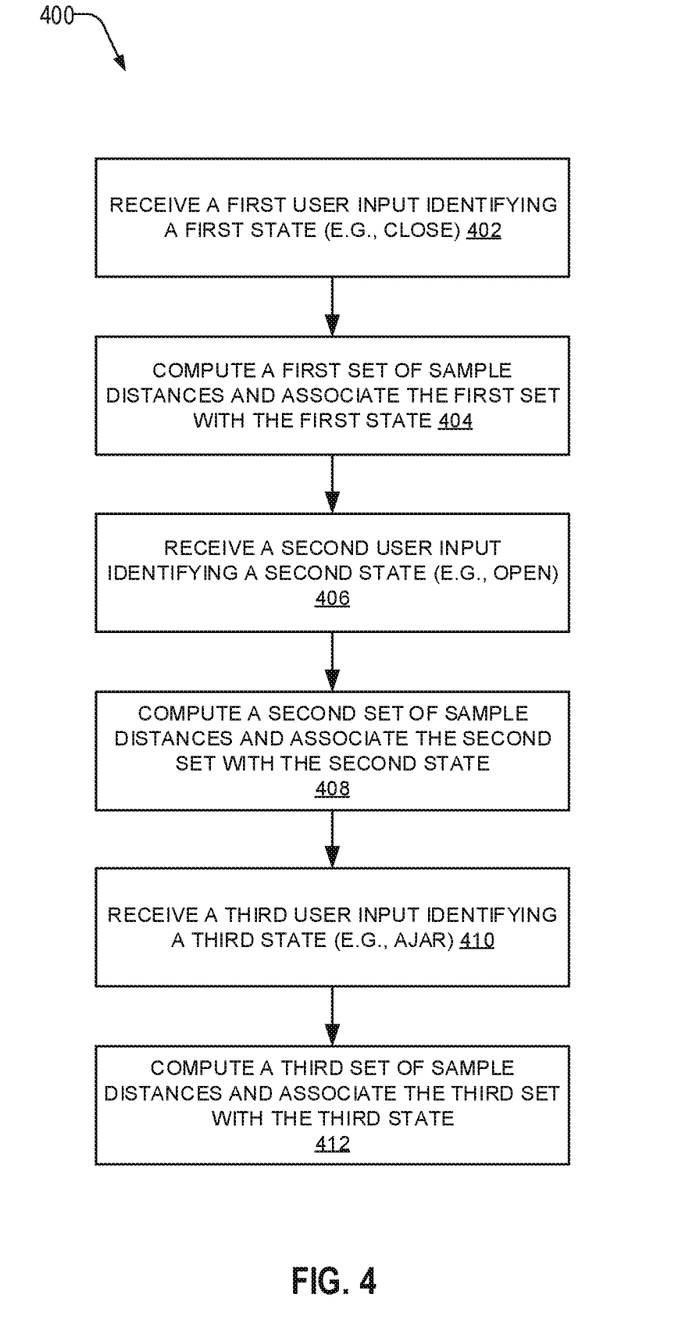
FIG. 4 is a flow diagram illustrating an example embodiment of a method for calibrating a dynamic range sensor.

FIG. 4 is a flow diagram illustrating an example embodiment of a method 400 for calibrating a dynamic range sensor device 106. At operation 402, the sensor device 106 receives a first user input identifying a first state (e.g., a user slides a switch to a specific switch position corresponding to a "closed" window position, or the user presses a button on the device 106). In one example embodiment, operation 402 may be implemented with the user input element 306. At operation 404, the sensor device 106 computes a first set of sampled distance measurements and associated the first set with the first state. In one example embodiment, operation 404 may be implemented with the dynamic range module 310 and the user-defined threshold module 312.

At operation 406, the sensor device 106 receives a second user input identifying a second state (e.g., a user slides a switch to a specific switch position corresponding to an "open" window position, or the user depresses twice a button on the device 106). In one example embodiment, operation 406 may be implemented with the user input element 306. At operation 408, the sensor device 106 computes a second set of sampled distance measurements and associates the second set with the second state. In one example embodiment, operation 408 may be implemented with the dynamic range module 310 and the user-defined threshold module 312.

At operation 410, the sensor device 106 receives a second user input identifying a third state (e.g., a user slides a switch to a specific switch position corresponding to an "ajar" window position, or the user presses three times a button on the device). In one example embodiment, operation 410 may be implemented with the user input element 306. At operation 412, the sensor device 106 computes a third set of sampled distance measurements and associates the second set with the third state. In one example embodiment, operation 408 may be implemented with the dynamic range module 310 and the user-defined threshold module 312.

Figure 5:
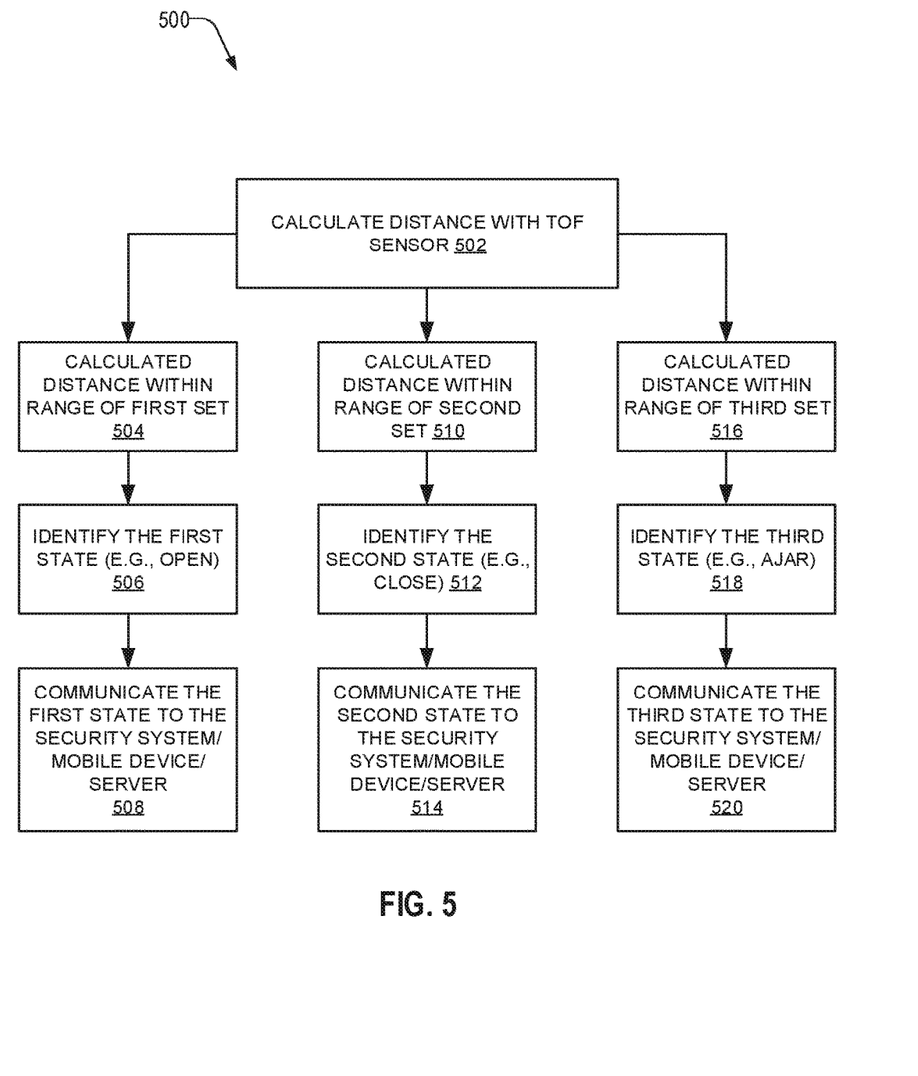
FIG. 5 is a flow diagram illustrating an example embodiment of a method for determining a position of a window using the dynamic range sensor device of FIG. 3.

FIG. 5 is a flow diagram illustrating an example embodiment of a method for determining a position of a window using the dynamic range sensor device 106 of FIG. 3. At operation 502, the sensor device 106 samples distance measurements using the distance sensor 301. In one example embodiment, operation 502 may be implemented using the dynamic range module 310. The dynamic range module 310 compares the sampled distance measurements with the ranges defined from the user-defined threshold module 312.

At operation 504, the trigger module 314 determines that the calculated or sample distance measurements fall within a range of the first set as previously defined at operation 404. For example, the first set includes the following sampled distance measurements: 12.2 mm, 12.1 mm, 12.0 mm, 11.8 mm. In one example embodiment, the range of the first set may be from 11.8 mm to 12.2 mm. Therefore, a measurement of 11.9 mm would fall between 11.8 mm and 12.2 mm and would indicate that the sensor device 106 is in the first state. In another example embodiment, the range of the first set may include buffer values added to the maximum and minimum values of the range. For example, if the buffer value is 0.5 mm, the range of the first set may be from 11.3 mm to 12.7 mm. The buffer value may be user-defined or may be computed based on a standard deviation of sampling measurements. For example, the buffer value may equal to the spread value between 11.8 mm and 12.2 mm (i.e., 0.4 mm). Thus, the range of the first set may be from 11.4 mm (11.8 mm−0.4 mm) to 12.6 mm (12.2 mm+0.4 mm).

At operation 506, the trigger module 314 determines that the sensor device 106 is in the first state (e.g., open). At operation 508, the trigger module 314 communicates the first state to the security system 208, the mobile device 210, or the server 204.

At operation 510, the trigger module 314 determines that the calculated or sample distance measurements fall within a range of the second set as previously defined at operation 408. At operation 512, the trigger module 314 determines that the sensor device 106 is in the second state (e.g., closed). At operation 514, the trigger module 314 communicates the second state to the security system 208, the mobile device 210, or the server 204.

At operation 516, the trigger module 314 determines that the calculated or sample distance measurements fall within a range of the third set as previously defined at operation 412. At operation 518, the trigger module 314 determines that the sensor device 106 is in the third state (e.g., ajar). At operation 520, the trigger module 314 communicates the third state to the security system 208, the mobile device 210, or the server 204.

Figure 6:
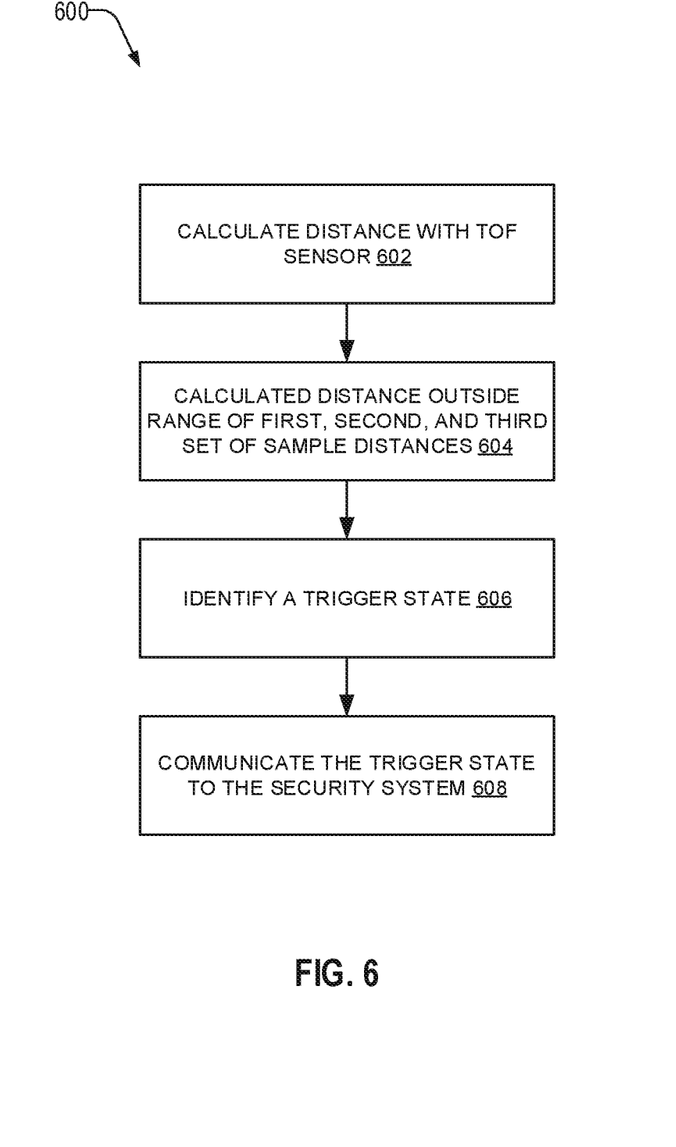
FIG. 6 is a flow diagram illustrating another example embodiment of a method for determining a position of a window using the dynamic range sensor device of FIG. 3.

FIG. 6 is a flow diagram illustrating an example embodiment of a method 600 for determining a position of a window using the dynamic range sensor device 106 of FIG. 3. At operation 602, the sensor device 106 samples distance measurements using the distance sensor 301. At operation 604, the sensor device 106 determines that the values of the sampled distance measurement are outside and does not fall within the first, second, and third ranges as previously defined in operations 408, 408, and 412. At operation 606, the sensor device 106 identifies a trigger state (e.g., alarm notification state) in response to determining that the values of the sampled distance measurement are outside and does not fall within the first, second, and third ranges. In one example embodiment, operation 606 may be implemented with the trigger module 314. At operation 608, the trigger module 314 of the sensor device 106 communicates the trigger state to the security system 208.

Figure 7:
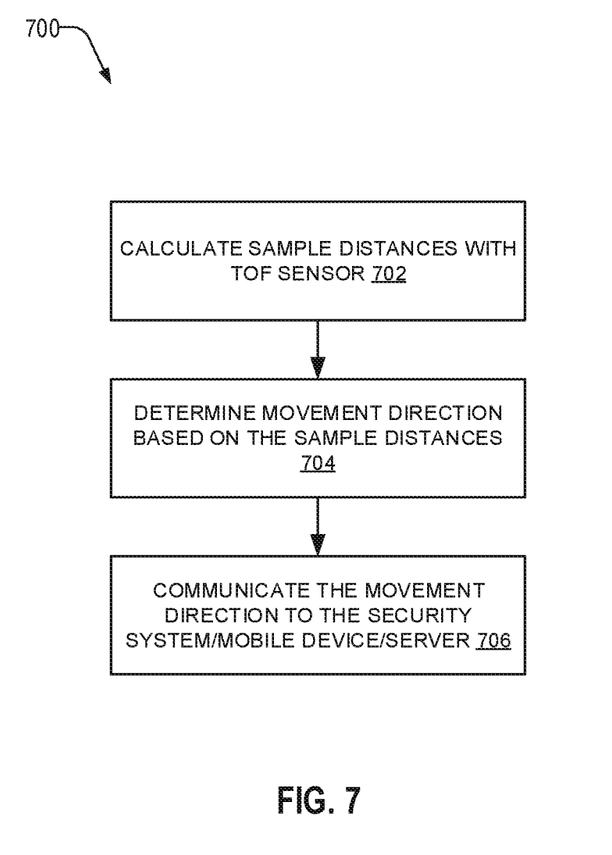
FIG. 7 is a flow diagram illustrating another example embodiment of a method for determining a position of a window using the dynamic range sensor device of FIG. 3.

FIG. 7 is a flow diagram illustrating another example embodiment of a method 700 for determining a position of a window using the dynamic range sensor device 106 of FIG. 3. At operation 702, the sensor device 106 calculates sampled distance measurements using the distance sensor 301. At operation 704, the sensor device 106 determines a movement direction of the sensor device 106 based on the sampled distance measurements. At operation 706, the sensor device 106 communicates the movement direction to the security system 208.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor 308 or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor 308 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 308 configured using software, the general-purpose processor 308 may be configured as respective different hardware modules at different times. Software may accordingly configure a processor 308, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors 308 that are temporarily configured (e.g., by software) or permanently configured to perform the relevant operations. Whether temporarily or permanently configured, such processors 308 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 308 or processor-implemented modules. The performance of certain of the operations may be distributed among the one or more processors 308, not only residing within a single machine, but deployed across a number of machines. In some example embodiments, the processor 308 or processors may be located in a single location (e.g., within a home environment, an office environment, or a server farm), while, in other embodiments, the processors 308 may be distributed across a number of locations.

The one or more processors 308 may also operate to support performance of the relevant operations in a "cloud computing" environment or as a "software as a service" (SaaS). For example, at least some of the operations may be performed by a group of computers (as examples of machines including processors 308), these operations being accessible via the communication network 206 and via one or more appropriate interfaces (e.g., application programming interfaces (APIs)).

Electronic Apparatus and System

Example embodiments may be implemented in digital electronic circuitry, in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor 308, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network 206.

In example embodiments, operations may be performed by one or more programmable processors 308 executing a computer program to perform functions by operating on input data and generating output. Method operations can also be performed by, and apparatus of example embodiments may be implemented as, special-purpose logic circuitry (e.g., an FPGA or an ASIC).

A computing system can include clients and servers 204. A client and server 204 are generally remote from each other and typically interact through a communication network 206. The relationship of client and server 204 arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor 308), or in a combination of permanently and temporarily configured hardware may be a design choice. Below are set out hardware (e.g., machine) and software architectures that may be deployed, in various example embodiments.

Example Machine Architecture

Figure 8:
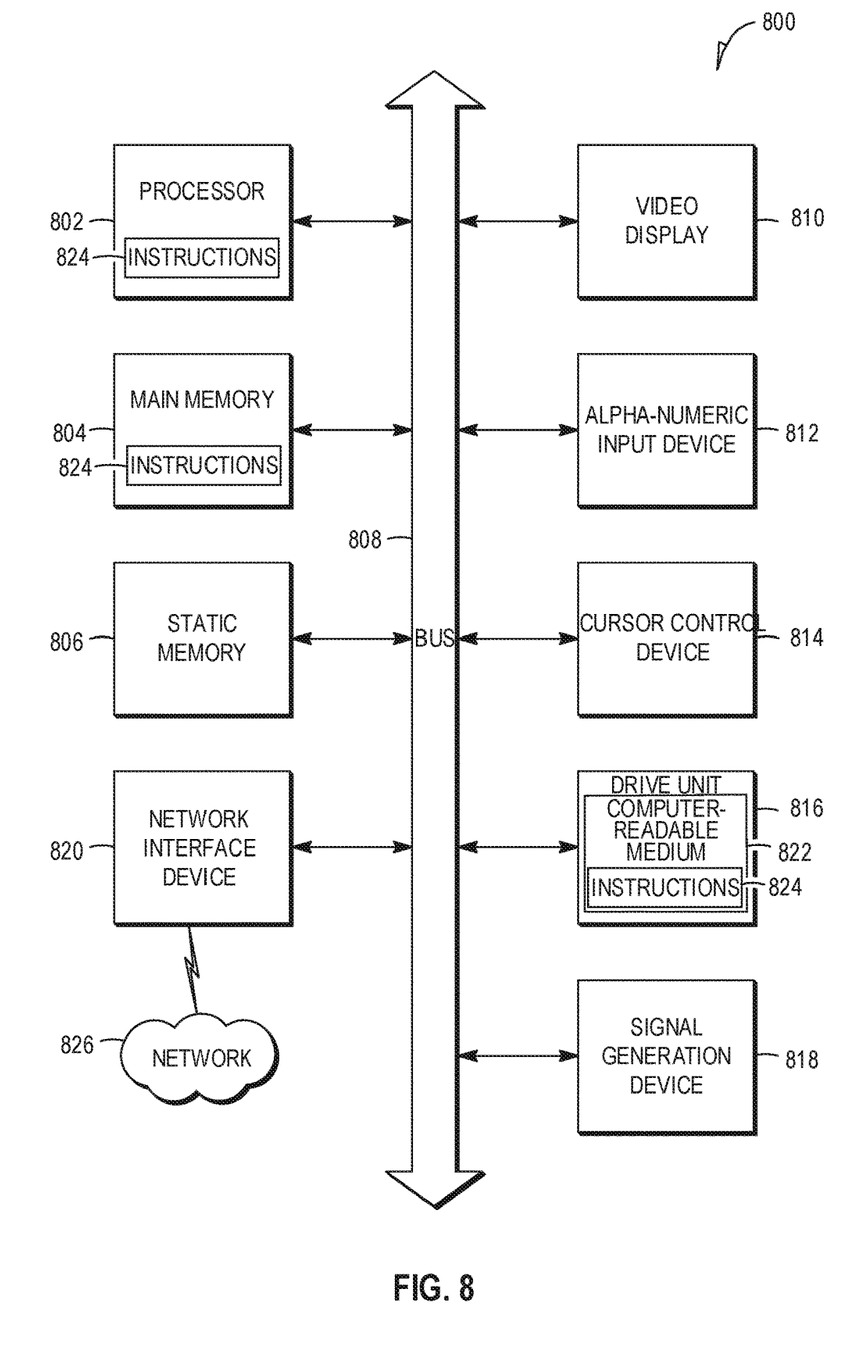
FIG. 8 shows a diagrammatic representation of a machine in the example form of a computer system within which a set of instructions may be executed to cause the machine to perform any one or more of the methodologies discussed herein.

FIG. 8 is a block diagram of a machine in the example form of a computer system 800 within which instructions 824 for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, a network switch, a network bridge, or any machine capable of executing the instructions 824 (sequential or otherwise) that specify actions to be taken by that machine. Further, while only a single machine is illustrated, the term "machine" shall also be taken to include any collection of machines that individually or jointly execute a set (or multiple sets) of instructions 824 to perform any one or more of the methodologies discussed herein.

The example computer system 800 includes a processor 802 (e.g., a central processing unit (CPU), a graphics processing unit (GPU), or both), a main memory 804, and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard), a user interface (UI) navigation (or cursor control) device 814 (e.g., a mouse), a disk drive unit 816, a signal generation device 818 (e.g., a speaker), and a network interface device 820.

Machine-Readable Medium

The disk drive unit 816 includes a computer (or machine)-readable medium 822 on which is stored one or more sets of data structures and instructions 824 (e.g., software) embodying or utilized by any one or more of the methodologies or functions described herein. The instructions 824 may also reside, completely or at least partially, within the main memory 804 and/or within the processor 802 during execution thereof by the computer system 800, the main memory 804 and the processor 802 also constituting computer-readable media 822. The instructions 824 may also reside, completely or at least partially, within the static memory 806.

While the computer-readable medium 822 is shown, in an example embodiment, to be a single medium, the term "machine-readable medium" may include a single medium or multiple media (e.g., a centralized or distributed database, and/or associated caches and servers) that store the one or more instructions 824 or data structures. The term "computer-readable medium" shall also be taken to include any tangible medium that is capable of storing, encoding, or carrying the instructions 824 for execution by the machine and that cause the machine to perform any one or more of the methodologies of the present embodiments, or that is capable of storing, encoding, or carrying data structures utilized by or associated with such instructions 824. The term "computer-readable medium" shall accordingly be taken to include, but not be limited to, solid-state memories, and optical and magnetic media. Specific examples of computer-readable media 822 include non-volatile memory, including by way of example semiconductor memory devices (e.g., erasable programmable read-only memory (EPROM), electrically erasable programmable read-only memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

Transmission Medium

The instructions 824 may further be transmitted or received over a communication network 826 using a transmission medium. The instructions 824 may be transmitted using the network interface device 820 and any one of a number of well-known transfer protocols (e.g., hypertext transfer protocol (HTTP)). Examples of communication networks 826 include a local-area network (LAN), a wide-area network (WAN), the Internet, mobile telephone networks, plain old telephone service (POTS) networks, and wireless data networks (e.g., Wi-Fi and WiMAX networks). The term "transmission medium" shall be taken to include any intangible medium capable of storing, encoding, or carrying the instructions 824 for execution by the machine, and includes digital or analog communications signals or other intangible media to facilitate communication of such software.

Although an embodiment has been described with reference to specific example embodiments, it will be evident that various modifications and changes may be made to these embodiments without departing from the scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A device comprising:
   a time of flight sensor configured to measure a distance of the time of flight sensor relative to a reflector external to the device, the time of flight sensor configured to be attached to a slidable barrier, the reflector configured to be attached to a frame of the slidable barrier;
   a user input element configured to receive an identification of the first position of the device relative to the reflector;
   a processor configured to perform operations comprising:
   generating a first set of sample distance measurements based on a first position of the time of flight sensor relative to the reflector, in response to receiving the identification of the first position of the device relative to the reflector;
   associating the identification of the first position with the first set of sample distance measurements;
   generating a second set of sample distance measurements based on a second position of the time of flight sensor relative to the reflector;
   determining a first range of the first set of sample distance measurements and a second range of the second set of sample distance measurements;
   comparing the first range with the second range;
   identifying a position of the device relative to the reflector based on the comparison;
   calculating sample distance measurements with the time of flight sensor; and
   determining a movement direction of the device relative to the reflector based on a change in the sample distance measurements.

2. The device of claim 1, wherein the device is configured to be mounted to a window, and the reflector is configured to be mounted to a frame of the window, the device being in a line of sight of the time of flight sensor, wherein the identification of the first position includes one of an open position, a closed position, and an ajar position.

3. The device of claim 1, wherein the user input element is configured to receive an identification of a second position of the device relative to the reflector, wherein the operations further comprise:
   generating a third set of sample distance measurements using the distance sensor;
   determining a third range of the third set of sample distance measurements; and
   associating the second position of the device with the third range of the third set of sample distance measurements in response to receiving the identification of the second position of the device relative to the reflector.

4. The device of claim 3, wherein the operations further comprise:
   determining that the second range does not overlap with the first range and the third range; and
   generating a trigger notification to a security system in response to determining that the second range does not overlap with the first range and the third range, the security system being configured to trigger an alarm in response to trigger notification.

5. The device of claim 1, wherein comparing the first range with the second range further comprises:
   determining that the first range overlaps with the second range; and
   determining that the device is at the first position in response to determining that the first range overlaps with the second range.

6. The device of claim 5, wherein a maximum measurement of the first set of sample distance measurements corresponds to a maximum value of the first range, a minimum measurement of the first set of sample distance measurements corresponds to a minimum value of the first range,
   wherein a maximum measurement of the second set of sample distance measurements corresponds to a maximum value of the second range, a minimum measurement of second set of sample distance measurements corresponds to a minimum value of the second range,
   wherein the operations further comprise:
   determining that the maximum value of the second range is less than the minimum value of the first range; and generating a trigger notification to a security system in response to determining that the maximum value of the second range is less than the minimum value of the first range, the security system being configured to trigger an alarm in response to trigger notification.

7. The device of claim 1, wherein the operations further comprise:
communicating the position of the device relative to the reflector to a security system, the security system configured to trigger an alarm in response to the second range being outside the first range.

8. The device of claim 1, wherein the user input element includes a multi-position switch operable at a first switch position corresponding to a first position of the device relative to the reflector, and at a second switch position corresponding to a second position of the device relative to the reflector.

9. The device of claim 1, wherein the user input element includes a single button switch, a first pattern of depressing the single button switch identifying a first position of the device relative to the reflector, a second pattern of depressing the single button switch identifying a second position of the device relative to the reflector.

10. The method of claim 1, wherein the user input element includes a single button switch, a first pattern of depressing the single button switch identifying a first position of the device relative to the reflector, a second pattern of depressing the single button switch identifying a second position of the device relative to the reflector.

11. A method comprising:
receiving, using a user input element of a device, an identification of a first position of the device relative to a reflector that is attached to a frame of a slidable barrier, the device comprising a time of flight sensor attached to the slidable barrier;
generating a first set of sample distance measurements based on a first position of the time of flight sensor relative to the reflector, in response to receiving the identification of the first position of the device relative to the reflector;
associating the identification of the first position with the first set of sample distance measurements;
generating a second set of sample distance measurements based on a second position of the time of flight sensor relative to the reflector;
determining a first range of the first set of sample distance measurements and a second range of the second set of sample distance measurements;
comparing the first range with the second range;
identifying a position of the device relative to the reflector based on the comparison;
calculating sample distance measurements with the time of flight sensor; and
determining a movement direction of the device relative to the reflector based on a change in the sample distance measurements.

12. The method of claim 11, wherein the device is configured to be mounted to a window, and the reflector is configured to be mounted to a frame of the window, the device being in a line of sight of the time of flight sensor, wherein the identification of the first position includes one of an open position, a closed position, and an ajar position.

13. The method of claim 11, further comprising:
receiving, via the user input element, an identification of a second position of the device relative to the reflector;
generating a third set of sample distance measurements using the time of flight sensor;
determining a third range of the third set of sample distance measurements; and
associating the second position of the device with the third range of the third set of sample distance measurements in response to receiving the identification of the second position of the device relative to the reflector.

14. The method of claim 13, further comprising:
determining that the second range does not overlap with the first range and the third range; and
generating a trigger notification to a security system in response to determining that the second range does not overlap with the first range and the third range, the security system being configured to trigger an alarm in response to trigger notification.

15. The method of claim 11, wherein comparing the first range with the second range further comprises:
determining that the first range overlaps with the second range; and
determining that the device is at the first position in response to determining that the first range overlaps with the second range.

16. The method of claim 15, wherein a maximum measurement of the first set of sample distance measurements corresponds to a maximum value of the first range, a minimum measurement of the first set of sample distance measurements corresponds to a minimum value of the first range,
wherein a maximum measurement of the second set of sample distance measurements corresponds to a maximum value of the second range, a minimum measurement of second set of sample distance measurements corresponds to a minimum value of the second range,
wherein the method further comprises:
determining that the maximum value of the second range is less than the minimum value of the first range; and
generating a trigger notification to a security system in response to determining that the maximum value of the second range is less than the minimum value of the first range, the security system being configured to trigger an alarm in response to trigger notification.

17. The method of claim 11, wherein the user input element includes a multi-position switch operable at a first switch position corresponding to a first position of the device relative to the reflector, and at a second switch position corresponding to a second position of the device relative to the reflector.

18. A non-transitory computer-readable storage medium storing a set of instructions that, when executed by a processor, cause the processor to perform operations comprising:
receiving, using a user input element of a device, an identification of a first position of the device relative to a reflector that is attached to a frame of a slidable barrier, the device comprising a time of flight sensor attached to the slidable barrier;
generating a first set of sample distance measurements based on a first position of the time of flight sensor relative to the reflector, in response to receiving the identification of the first position of the device relative to the reflector;
associating the identification of the first position with the first set of sample distance measurements;
generating a second set of sample distance measurements based on a second position of the time of flight sensor relative to the reflector;

determining a first range of the first set of sample distance measurements and a second range of the second set of sample distance measurements;
comparing the first range with the second range;
identifying a position of the device relative to the reflector based on the comparison;
calculating sample distance measurements with the time of flight sensor; and
determining a movement direction of the device relative to the reflector based on a change in the sample distance measurements.

\* \* \* \* \*

UNITED STATES PATENT AND TRADEMARK OFFICE
CERTIFICATE OF CORRECTION

PATENT NO.        : 10,393,875 B2
APPLICATION NO.   : 15/847767
DATED             : August 27, 2019
INVENTOR(S)       : Sivakumar Kathan Page 1 of 1

It is certified that error appears in the above-identified patent and that said Letters Patent is hereby corrected as shown below:

On the Title Page

In item (72), in "Inventor", in Column 1, Line 1, delete "Ocenaside," and insert --Oceanside,-- therefor In the Claims In Column 13, Line 24, in Claim 10, delete "method" and insert --device-- therefor Signed and Sealed this
Twelfth Day of May, 2020

Andrei Iancu
*Director of the United States Patent and Trademark Office*